(12) United States Patent
Sy

(10) Patent No.: US 12,717,128 B2
(45) Date of Patent: Aug. 25, 2026

(54) MULTI-BOUNCE OPTICAL BEAM STEERING

(71) Applicant: Lumentum Operations LLC, San Jose, CA (US)

(72) Inventor: Fredrik Sy, Ottawa (CA)

(73) Assignee: Lumentum Operations LLC, San Jose, CA (US)

( * ) Notice: Subject to any disclaimer, the term of this patent is extended or adjusted under 35 U.S.C. 154(b) by 358 days.

(21) Appl. No.: 18/503,364

(22) Filed: Nov. 7, 2023

(65) Prior Publication Data

US 2025/0076638 A1 Mar. 6, 2025

Related U.S. Application Data

(60) Provisional application No. 63/580,884, filed on Sep. 6, 2023.

(51) Int. Cl.
*G02B 26/08* (2006.01)
*G02B 26/10* (2006.01)

(52) U.S. Cl.
CPC .................................. *G02B 26/105* (2013.01)

(58) Field of Classification Search
CPC .............. G02B 26/105; G02B 26/0816; G02B 26/0833; G02F 1/29; G02F 1/292
See application file for complete search history.

(56) References Cited

U.S. PATENT DOCUMENTS

2018/0288504 A1* 10/2018 Yang .................. H04Q 11/0005
2024/0337823 A1* 10/2024 Xiao .................... G02B 26/105

* cited by examiner

*Primary Examiner* — Euncha P Cherry
(74) *Attorney, Agent, or Firm* — Harrity & Harrity, LLP

(57) ABSTRACT

In some implementations, a beam steering system includes a beam steering element configured to steer an optical beam having a beam waist, and an optical system configured to return the optical beam to the beam steering element to provide multiple bounces of the optical beam on the beam steering element. The beam waist of the optical beam may be maintained from inputting the optical beam to the beam steering element to outputting the optical beam from the beam steering element.

20 Claims, 5 Drawing Sheets

100

450

MULTI-BOUNCE OPTICAL BEAM STEERING

CROSS-REFERENCE TO RELATED APPLICATION

This patent application claims priority to U.S. Provisional Patent Application No. 63/580,884, filed on Sep. 6, 2023, and entitled "MULTI-BOUNCE BEAM STEERING." The disclosure of the prior application is considered part of and is incorporated by reference into this patent application.

TECHNICAL FIELD

The present disclosure relates generally to optical beam steering and to multi-bounce optical beam steering.

BACKGROUND

In optical systems, beam steering may be accomplished through the use of mirrors. Optical beam steering approaches may include phased-array optics and/or micro-electromechanical systems (MEMS) using micro-mirrors.

SUMMARY

In some implementations, a beam steering system includes a beam steering element configured to steer an optical beam having a beam waist, where the beam steering element is oriented at a tilt angle relative to the optical beam. The beam steering system may include an optical system including a first mirror that faces the beam steering element, and a second mirror that faces the first mirror. The optical system may be configured to return the optical beam to the beam steering element to provide multiple bounces of the optical beam on the beam steering element. The beam waist of the optical beam may be maintained from inputting the optical beam to the beam steering element to outputting the optical beam from the beam steering element.

In some implementations, an optical system includes a first mirror configured to face a beam steering element that is to steer an optical beam having a beam waist, and a second mirror that faces the first mirror. The optical system may be configured to return the optical beam to the beam steering element to provide multiple bounces of the optical beam on the beam steering element. The optical system may be configured to image the beam waist of the optical beam on the beam steering element.

In some implementations, a beam steering system includes a beam steering element configured to steer an optical beam having a beam waist, and an optical system configured to return the optical beam to the beam steering element to provide multiple bounces of the optical beam on the beam steering element. The beam waist of the optical beam may be maintained from inputting the optical beam to the beam steering element to outputting the optical beam from the beam steering element.

DETAILED DESCRIPTION

The following detailed description of example implementations refers to the accompanying drawings. The same reference numbers in different drawings may identify the same or similar elements.

Beam steering is useful in applications including three-dimensional (3D) sensing, lidar, and/or for switching in wavelength selective switch (WSS) devices, among other examples. Techniques to steer and/or redirect light may use MEMS mirrors, liquid crystal on silicon (LCoS) devices, and/or optical phased arrays, among other examples. However, in general, beam steering technologies, such as MEMS or LCOS devices, suffer from limited steering angle. For example, in MEMS-based beam steering, increasing a MEMS mirror area reduces a steering angle range. As another example, in LCoS-based beam steering, a limited phase range results in insertion loss (IL) penalties for very high steering angles. Techniques to increase steering angle may use a telescope magnifier (e.g., a two-lens afocal telescope system) to magnify beam angle. However, using a telescope magnifier may also change a beam waist, which can negatively impact performance in applications such as 3D sensing, lidar, or the like.

Some implementations described herein enable beam steering with an increased steering angle. In some implementations, a beam steering system that produces an increased steering angle may include a beam steering element (e.g., a MEMS mirror) and an optical system. The optical system may be configured to return an optical beam to the beam steering element to provide multiple bounces of the optical beam on the beam steering element. By directing multiple bounces of the optical beam on the beam steering element, the optical beam is steered multiple times by the beam steering element. Accordingly, each additional bounce of the optical beam on the beam steering element increases an output angle of the optical beam.

Moreover, the optical system may be configured to return the optical beam to the beam steering element such that the beam waist of the optical beam is incident on the beam steering element. Accordingly, the beam waist of the optical beam can be maintained from an input of the optical beam to an output of the optical beam. In this way, the beam steering system increases the beam steering angle while preserving the beam waist of the optical beam. Thus, the beam steering system may be used to improve performance in applications such as 3D sensing, lidar, wavelength selective switching, or the like.

Figure 1:
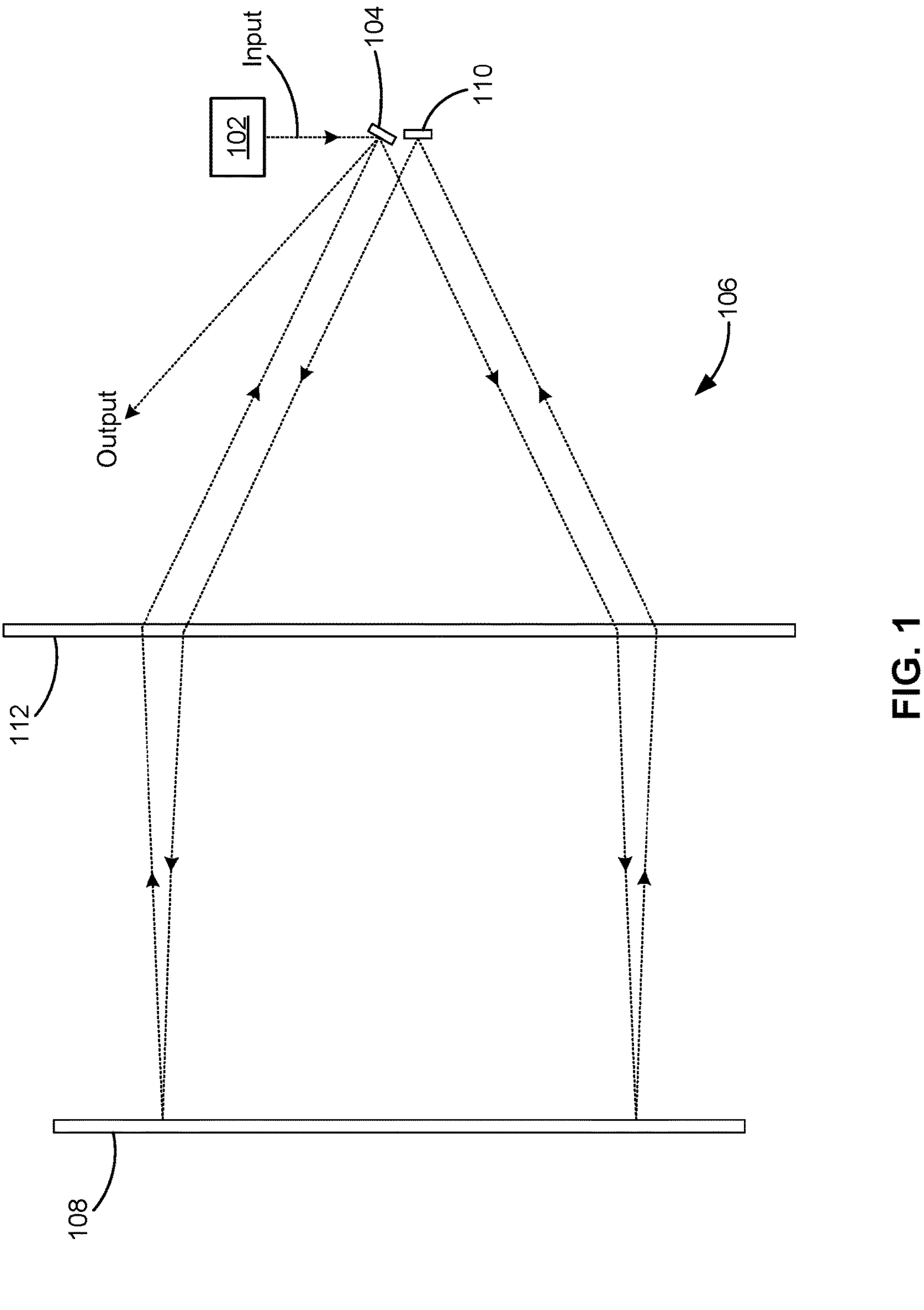
FIG. 1 is a diagram of an example beam steering system.

FIG. 1 is a diagram of an example beam steering system 100. The beam steering system 100 may be, or may be included in, a 3D sensing system, a lidar system, a WSS device, or the like. The beam steering system 100 may include an optical source 102, a beam steering element 104, and an optical system 106. In some implementations, the beam steering system 100 may include a package, a housing, a casing, or the like that contains the optical source 102, the beam steering element 104, and/or the optical system 106.

The optical source 102 may include a device configured to emit an optical beam, such as a laser beam (e.g., the optical source 102 may include a laser source). The optical beam has a beam waist. For example, the optical beam may be a Gaussian beam. The optical source 102 may include a vertical cavity surface emitting laser (VCSEL), an edge-emitting laser, or the like. In some implementations, the optical source 102 may be coupled to one or more optical fibers (not shown). For example, the optical source 102 may be remote from the beam steering system 100 and coupled to one or more input optical fibers (e.g., input ports) of the beam steering system 100.

The beam steering element 104 may include a tiltable mirror, a MEMS mirror, an LCOS device (e.g., an LCoS panel), an optical phased array, a metamaterial structure, or another device having a capability to steer an optical beam. The beam steering element 104 may be configured to steer the optical beam. For example, the beam steering element 104 may be configured to reflect the optical beam. Each interaction (e.g., steering, reflection, or the like) of the optical beam with the beam steering element 104 may be referred to as a "bounce" of the optical beam. The beam steering element 104 may be oriented at a tilt angle relative to the optical beam (e.g., relative to a propagation direction of the optical beam).

The beam steering system 100 may be configured to input the optical beam, from the optical source 102, to the beam steering element 104 (e.g., to impinge the optical beam on the beam steering element 104). In some implementations, the optical beam is input to the beam steering element 104 such that the beam waist of the optical beam is on (e.g., is imaged on) the beam steering element 104. For example, the beam waist of the optical beam may be focused on the beam steering element 104 (e.g., using a lens or the like). Inputting the optical beam to the beam steering element 104 results in an initial bounce of the optical beam on the beam steering element 104 that directs the optical beam to the optical system 106.

The optical system 106 may be configured to return the optical beam to the beam steering element 104 (e.g., following the initial bounce of the optical beam from the beam steering element 104). For example, the beam steering element 104 may steer (e.g., reflect) the optical beam to the optical system 106 (e.g., in the initial bounce on the beam steering element 104), and the optical system 106 may return the optical beam to the beam steering element 104 (e.g., to facilitate at least one additional bounce on the beam steering element 104). Accordingly, the optical system 106 may be configured to return the optical beam to the beam steering element 104 to provide multiple bounces of the optical beam on the beam steering element 104 (e.g., the initial bounce on the beam steering element 104 when the optical beam is input to the beam steering element 104 and at least one additional bounce on the beam steering element 104 when the optical beam is returned to the beam steering element 104 by the optical system 106). For example, the optical system 106 may be configured to provide 2 bounces, 3 bounces, 4 bounces, 6 bounces, or the like, of the optical beam on the beam steering element 104. In some implementations, the optical system 106 may be configured to return the optical beam to the beam steering element 104 such that the beam waist of the optical beam is on the beam steering element 104 (e.g., the optical system 106 may be configured to image the beam waist of the optical beam on the beam steering element 104).

The optical system 106 may include one or more mirrors and/or one or more lenses configured to return the optical beam to the beam steering element 104. In some implementations, the optical system 106 may include at least a first mirror 108 and a second mirror 110. The first mirror 108 may be a fixed back mirror of the optical system 106, and the second mirror 110 may be a fixed mirror of the optical system 106. The first mirror 108 (e.g., a reflective surface of the first mirror 108) may face the beam steering element 104, such that the optical beam is steered from the beam steering element 104 to the first mirror 108 one or more times. The second mirror 110 (e.g., a reflective surface of the second mirror 110) may face the first mirror 108. For example, the first mirror 108 may have a reflective surface opposing reflective surfaces of the beam steering element 104 and the second mirror 110. A mirror "facing" an element (e.g., the beam steering element 104 or another mirror) may mean that the mirror can reflect light onto the element without any additional mirrors (e.g., the element is in front of a reflective surface of the mirror rather than behind the reflective surface of the mirror).

The second mirror 110 may be aligned (e.g., in plane) with the beam steering element 104 relative to the first mirror 108. For example, the second mirror 110 and the beam steering element 104 may be positioned at a same lateral distance from the first mirror 108 (e.g., measured from centers of the second mirror 110 and the beam steering element 104), as shown. The first mirror 108 may be larger than the second mirror 110 and the beam steering element 104.

In some implementations, as shown in FIG. 1, the optical system 106 may have a transmissive configuration. For example, the optical system 106 may include a lens 112. The lens 112 may be positioned between the first mirror 108, and the beam steering element 104 and the second mirror 110. That is, the first mirror 108 may be positioned to a first side of the lens 112, and the beam steering element 104 and the second mirror 110 may be positioned to a second side of the lens 112. For example, the optical beam passes through the lens 112 when traveling between the first mirror 108 and the beam steering element 104, and the optical beam passes through the lens 112 when traveling between the first mirror 108 and the second mirror 110.

A first distance between the lens 112 and the first mirror 108 may be approximately equal to (e.g., within ±1%) a second distance between the lens 112 and the beam steering element 104 and the second mirror 110 (e.g., the beam steering element 104, the first mirror 108, and the second mirror 110 may each be approximately the same distance from the lens 112). In some implementations, a focal length of the lens 112 may be configured to focus the beam waist of the optical beam on the beam steering element 104, the first mirror 108, and/or the second mirror 110. For example, the focal length of the lens 112 may be approximately equal to (e.g., within ±1%) the first distance and the second distance. As an example, the focal length of the lens 112 may be approximately equal to the Rayleigh range of the optical beam (e.g., a Gaussian beam). The transmissive configuration of the optical system 106 may include one or more additional lenses and/or one or more additional mirrors to those described herein, and/or may omit one or more mirrors described herein, to achieve a desired number of bounces of the optical beam on the beam steering element 104. In some implementations, one or more mirrors of the transmissive configuration of the optical system 106 may be flat mirrors, curved mirrors, fixed mirrors, and/or tiltable mirrors. As an alternative to the transmissive configuration, the optical system 106 may have a fully reflective configuration that omits a lens, as described in connection with FIG. 3.

Furthermore, the optical system 106 may have a configuration other than those described herein, provided that the optical system 106 returns the optical beam to the beam steering element 104 one or more times to provide multiple bounces of the optical beam on the beam steering element 104.

The beam steering system 100 may be configured to output the optical beam from the beam steering element 104. For example, the beam steering system 100 may output the optical beam to an environment of the beam steering system 100, to one or more output optical fibers (e.g., output ports) of the beam steering system 100, or the like. As a result of the multiple bounces of the optical beam on the beam steering element 104, the optical beam is output from the beam steering element 104 at an output angle (e.g., with respect to the beam steering element 104).

In some implementations, the output angle (e.g., resulting from the multiple bounces of the optical beam on the beam steering element 104) is approximately an integer multiple (e.g., ±0.1 of an integer) of the tilt angle of the beam steering element 104. In some implementations, the output angle (e.g., resulting from the multiple bounces of the optical beam on the beam steering element 104) is at least approximately twice (e.g., 1.8 times or more) a steering angle of the optical beam from the beam steering element 104 resulting from a single bounce of the optical beam on the beam steering element 104. For example, if an initial bounce on the beam steering element 104 (e.g., when the optical beam is input to the beam steering element 104) reflects the optical beam at an angle A, then the output angle of the optical beam, resulting from the multiple bounces of the optical beam on the beam steering element 104, will have an angle of at least approximately 2A. In this way, the multiple bounces increase the output angle of the optical beam. In some implementations, the beam waist of the optical beam is maintained (e.g., at a same radius) from input to the beam steering element 104 to output from the beam steering element 104 (e.g., the beam waist of the optical beam is not increased due to increasing the output angle).

In some implementations, the beam steering system 100 may include a beam steering element array, and the beam steering element 104 may be included in the beam steering element array. The array may be a one-dimensional array (e.g., a single row, or a single column, of beam steering elements) or a two-dimensional array (e.g., multiple rows and/or multiple columns of beam steering elements). The array may be configured such that each beam steering element is independently controllable. Furthermore, a number of optical beams input to the array may be equal to (or less than) a number of beam steering elements in the array. In some implementations, the array of beam steering elements may be used in a WSS or the like.

As indicated above, FIG. 1 is provided as an example. Other examples may differ from what is described with regard to FIG. 1.

Figure 2:
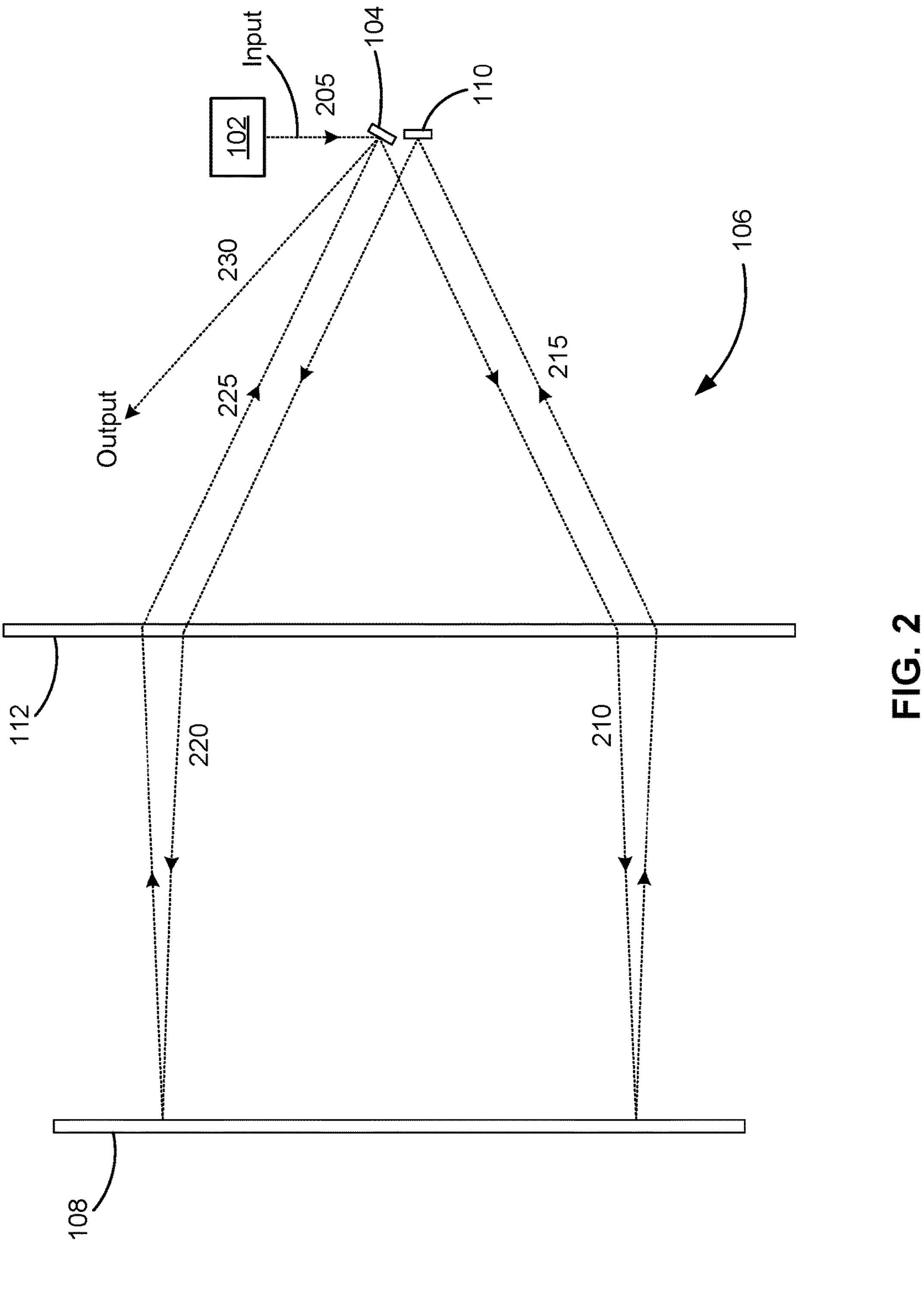
FIG. 2 is a diagram of an example operation of a beam steering system.

FIG. 2 is a diagram of an example operation of the beam steering system 100.

As shown in FIG. 2, and by reference number 205, an optical beam may be input to the beam steering element 104. For example, the optical beam may be focused such that a beam waist of the optical beam is incident on the beam steering element 104. As shown by reference number 210, a first bounce on the beam steering element 104 may steer the optical beam to the first mirror 108 via the lens 112. As shown by reference number 215, the optical beam may reflect from the first mirror 108, and the first mirror 108 and the lens 112 may image the optical beam on the second mirror 110. As shown by reference number 220, the optical beam may reflect from the second mirror 110 to the first mirror 108 via the lens 112. As shown by reference number 225, the optical beam may reflect again from the first mirror 108, and the first mirror 108 and the lens 112 may image the optical beam on the beam steering element 104. As shown by reference number 230, a second bounce on the beam steering element 104 may output the optical beam. Thus, having been bounced twice by the beam steering element 104, the optical beam is steered twice by the beam steering element 104, thereby increasing an output angle of the optical beam. As described herein, additional bounces of the optical beam on the beam steering element 104 may be produced to further increase the output angle of the optical beam.

In some implementations, a tilt angle of the beam steering element 104 may be set at a particular value to produce a particular output angle of the optical beam. In some implementations, a tilt angle of the beam steering element 104 may be adjusted while the beam steering system 100 is in use (e.g., while the optical source 102 is on) to change the output angle of the optical beam. For example, the tilt angle of the beam steering element 104 may be adjusted in a sweeping pattern to produce a sweeping of the optical beam. In some implementations, the beam steering system 100 may include, or may be in communication with, a controller (not shown) that is configured to control the tilt angle of the beam steering element 104.

As indicated above, FIG. 2 is provided as an example. Other examples may differ from what is described with regard to FIG. 2. For example, the optical system 106 may have a different configuration from that shown in FIG. 2 (e.g., the optical system 106 may have a reflective configuration, as described herein), which would result in a different operation of the beam steering system 100 from that described in FIG. 2.

Figure 3:
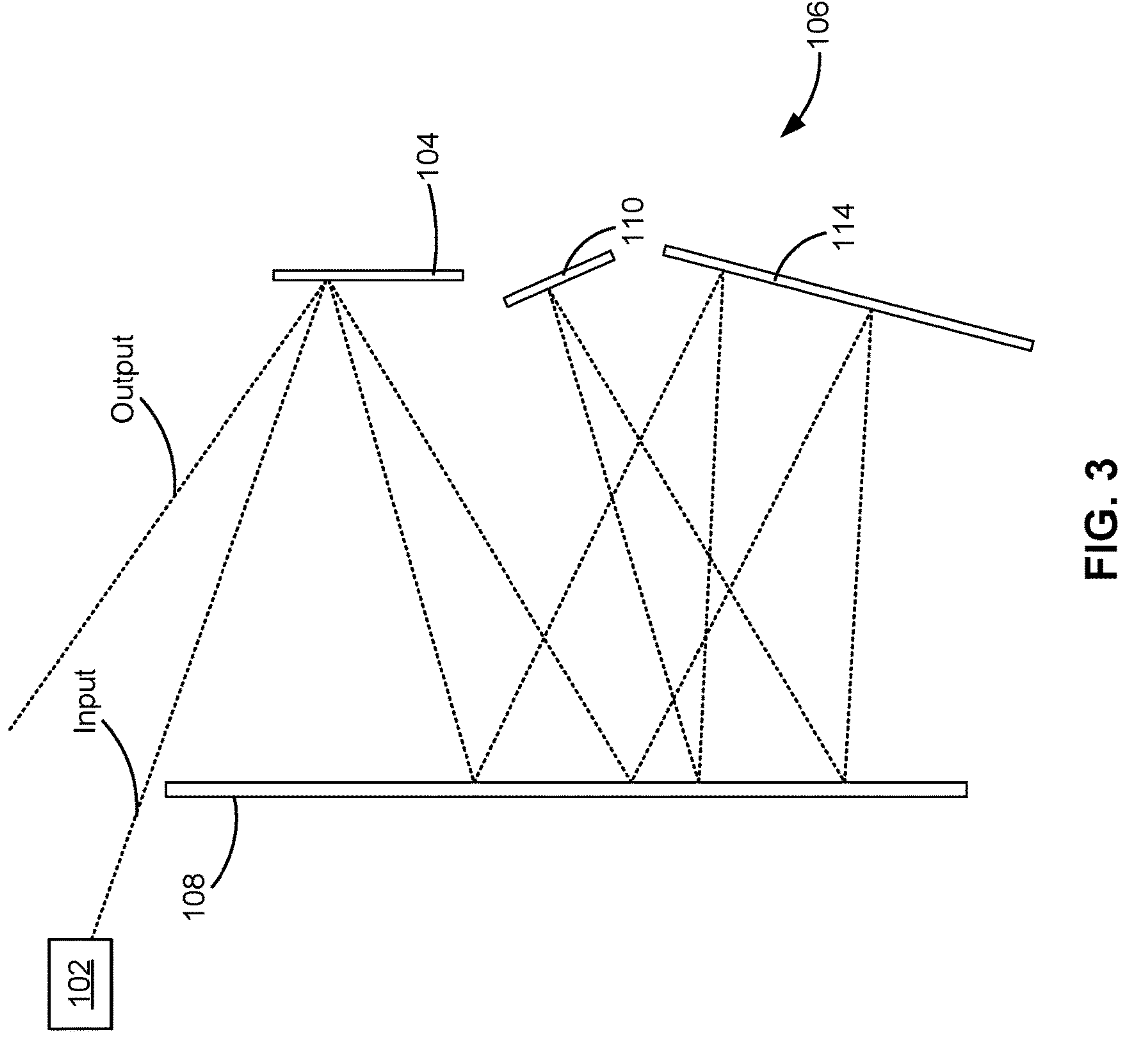
FIG. 3 is a diagram of an example beam steering system.

FIG. 3 is a diagram of the example beam steering system 100. In FIG. 3, the optical system 106 has a fully reflective configuration. In the reflective configuration, the optical system 106 may include multiple mirrors (e.g., multiple fixed mirrors). For example, the optical system 106 may include the first mirror 108, the second mirror 110, and a third mirror 114 that also faces the first mirror 108. As an example, the first mirror 108 may have a reflective surface opposing reflective surfaces of the beam steering element 104, the second mirror 110, and the third mirror 114. The second mirror 110 and the third mirror 114 may be aligned (e.g., in plane) with the beam steering element 104 relative to the first mirror 108, in a similar manner as described above. For example, the second mirror 110, the third mirror 114, and the beam steering element 104 may be positioned at a same lateral distance from the first mirror 108, in a similar manner as described above. In some implementations, the second mirror 110 and the third mirror 114 may be arranged at an angle relative to each other and/or at an angle relative to the beam steering element 104. In some implementations, the second mirror 110 and the third mirror 114 may be flat mirrors. The second mirror 110 and the third mirror 114 may be configured to image the beam waist of the optical beam on the beam steering element 104 and/or the first mirror 108.

In some implementations, the first mirror 108 may be a curved mirror in the reflective configuration. For example, using the curved mirror instead of the lens 112 of the transmissive configuration, as well as the arrangement of the second mirror 110 and the third mirror 114, may enable the reflective configuration to operate in a similar manner as the transmissive configuration, as described herein. In some implementations, a focal length of the first mirror 108 (e.g., the curved mirror) may be configured to focus the beam waist of the optical beam on the beam steering element 104, the second mirror 110, and/or the third mirror 114. For example, a focal length of the first mirror 108 (e.g., the curved mirror) may be approximately equal to a distance between the first mirror 108 and the beam steering element 104. The reflective configuration of the optical system 106 may include one or more additional mirrors to those described herein, and/or may omit one or more mirrors described herein, to achieve a desired number of bounces of the optical beam on the beam steering element 104. In some implementations, one or more mirrors of the reflective configuration of the optical system 106 may be flat mirrors, curved mirrors, fixed mirrors, and/or tiltable mirrors.

As indicated above, FIG. 3 is provided as an example. Other examples may differ from what is described with regard to FIG. 3.

Figure 4A:
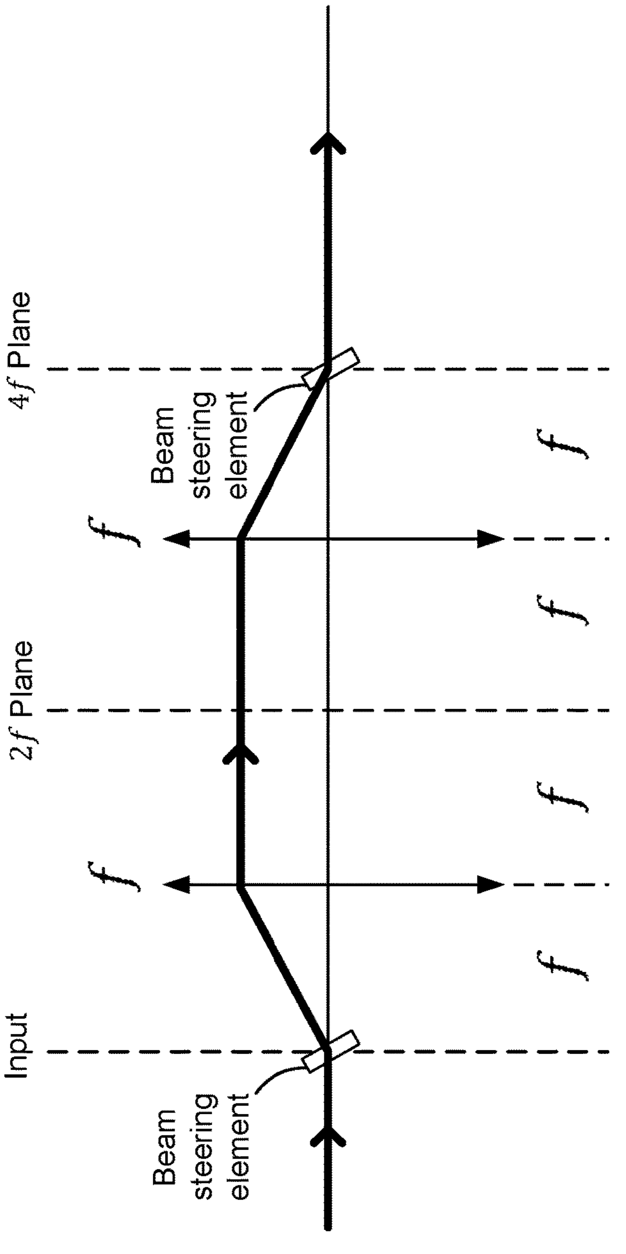
FIGS. 4A-4B are diagrams of examples of imaging a beam steering element onto itself.
Figure 4B:
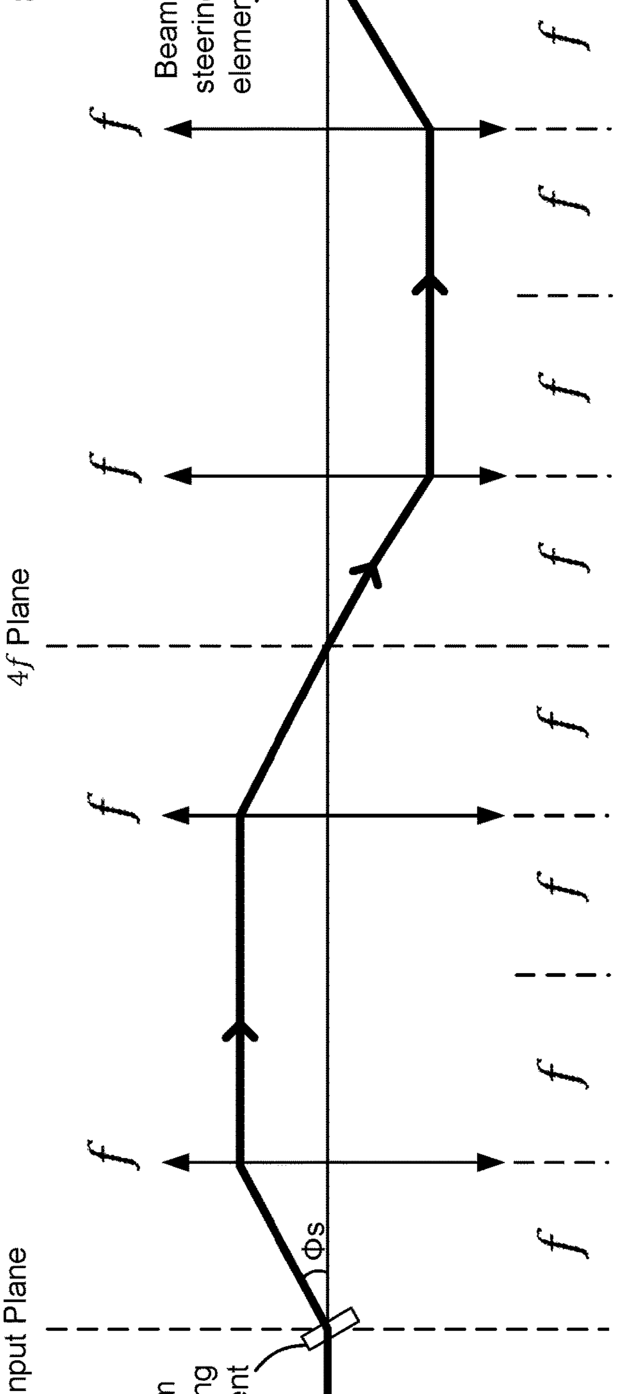

FIGS. 4A-4B are diagrams of examples 400, 450 of imaging a beam steering element (e.g., beam steering element 104) onto itself. Example 400 of FIG. 4A relates to imaging a beam steering element onto itself via a 4f system. Example 450 of FIG. 4B relates to imaging a beam steering element onto itself via an 8f system. The multi-bounce beam steering described herein achieves a constant beam waist and increases steering angle sensitivity (e.g., angular magnification). FIGS. 4A-4B provide the mathematical basis for achieving the constant beam waist and increased steering angle sensitivity.

A wave function analysis of beam waist can be performed following J. W. Goodman's Wave Operator Notation (Goodman, J. W., *Introduction to Fourier Optics,* 3rd ed. (2005)) and with the following definitions:

(Quadratic phase/lens)

$$Q[c]\{U(x)\} = e^{i\frac{k}{2}cx^2}U(x) \quad \text{Equation 1}$$

(Scaling)

$$\mathcal{V}[b]\{U(x)\} = b^{\frac{1}{2}}U(bx) \quad \text{Equation 2}$$

(Fourier transform)

$$\mathcal{F}\{U(x)\} = \int_{-\infty}^{\infty} U(x)e^{-i2\pi fx}dx \quad \text{Equation 3}$$

(Free space propagation)

$$\mathcal{R}[d]\{Q(x)\} = \frac{1}{i\lambda d}\int_{-\infty}^{\infty} U(x_1)e^{i\frac{k}{2d}(x_2-x_1)^2}dx_1 \quad \text{Equation 4}$$

where U(x) represents the wave function of the field (e.g., the electric field). In the case of a 2f system, this can written as:

$$S_{2f} = \mathcal{V}\left[\frac{1}{\lambda f}\right]\mathcal{F} = \mathcal{R}[f]Q\left[-\frac{1}{f}\right]\mathcal{R}[f] \quad \text{Equation 5}$$

where the standard result is that for Fourier planes there is scaling and Fourier transform two-dimensional (2D) relation between the planes. In the case of a 4f imaging system, the following can be derived:

$$S_{4f} = \mathcal{V}\left[\frac{1}{\lambda f}\right]\mathcal{F}\mathcal{V}\left[\frac{1}{\lambda f}\right]\mathcal{F} = \mathcal{V}[-1] \quad \text{Equation 6}$$

and with the relations:

$$\mathcal{F}\mathcal{F} = \mathcal{V}[-1] \quad \text{Equation 7}$$

$$\mathcal{V}[b]\mathcal{F} = \mathcal{F}\mathcal{V}\left[\frac{1}{b}\right] \quad \text{Equation 8}$$

which gives the result that a 4f system images the wave with the same beam waist for a Gaussian beam but with an inversion from the V[−1]. This means that an 8f, 12f, etc. system also keeps the beam waist and for an 8f, 16f . . . 8Nf system the inversion disappears. An inversion of the beam waist can be problematic. For example, because of the inversion, the beam on the beam steering element cannot be trivially imaged back onto itself to get double the beam steering angle. As described in the ray optics analysis below, using an 8f-like imaging system can remedy the inversion issue. The properties of beam waist described herein can be extended even for off-axis beams by staying reasonably within the paraxial approximation.

A ray optics analysis may focus on tracking the chief ray of a Gaussian beam as the ray travels along an imaging system. Example 400 in FIG. 4A shows a 4f system (that is expanded on in FIG. 4B to describe 8f, 12f, etc. imaging systems). In particular, FIG. 4A shows a paraxial transmissive model of an imaging system with a steering element, as described herein. As shown, the steered beam ends up having no change in angle due to the inversion effect of the 4f imaging system.

The following standard ray matrix notation is adapted from B. E. A. Saleh and M. C. Teich (Saleh, B. E. A., Teich, M. C., *Fundamentals of Photonics. Part* 1*: Optics,* 3rd ed. (2019)):

(Ray matrix)

$$M = \begin{bmatrix} A & B \\ C & D \end{bmatrix} \quad \text{Equation 9}$$

(Ray matrix)

$$\begin{bmatrix} y_2 \\ \theta_2 \end{bmatrix} = \begin{bmatrix} A & B \\ C & D \end{bmatrix}\begin{bmatrix} y_1 \\ \theta_1 \end{bmatrix} \quad \text{Equation 10}$$

Thus, for a 2f system and a 4f system, the ray matrices are as follows:

(2f ray matrix)

$$M_{2f} = \begin{bmatrix} 0 & f \\ -\frac{1}{f} & 0 \end{bmatrix} \quad \text{Equation 11}$$

(4f ray matrix)

$$M_{4f} = \begin{bmatrix} 1 & 0 \\ 0 & -1 \end{bmatrix} \quad \text{Equation 12}$$

The beam position and angles at each stage of the optical system will now be described. The beam has an initial position $y_0$ and angle $\theta_0$:

$$\begin{bmatrix} y_0 \\ \theta_0 \end{bmatrix}$$

After hitting the beam steering element, the beam steering element angle contribution $\phi_s$ is added:

$$\begin{bmatrix} y_0 \\ \theta_0 + \phi_s \end{bmatrix}$$

and after the 2f system:

$$M_{2f}\begin{bmatrix} y_0 \\ \theta_0 + \phi_0 \end{bmatrix} = \begin{bmatrix} 0 & f \\ -\frac{1}{f} & 0 \end{bmatrix}\begin{bmatrix} y_0 \\ \theta_0 + \phi_s \end{bmatrix} = \begin{bmatrix} f\theta_0 + f\phi_s \\ -\frac{y_0}{f} \end{bmatrix} \quad \text{Equation 13}$$

where the positions and angle have been flipped based on the focal length. This factors into the design of the optical system because the position of the beam steering element and hence the output angles are unchanged, but the positions after the 2f will change.

The chief ray then goes through another 2f system (effectively a 4f system) yielding:

$$M_{2f}M_{2f}\begin{bmatrix} y_0 \\ \theta_0 + \phi_s \end{bmatrix} = \begin{bmatrix} -y_0 \\ -\theta_0 - \phi_s \end{bmatrix} \quad \text{Equation 14}$$

Thus, imaging a steering element surface onto itself (choosing $y_0=0$ allows this) may produce undesirable results because the angle flips in direction. In a 4f system, imaging the beam steering element to itself results in a total angle $\theta_f$.

$$\theta_f = -\theta_0 - \phi_s + \phi_s = \theta_0 \quad \text{Equation 15}$$

with the last two elements showing how the beam steering element contributions cancel each other out, as shown in FIG. 4A.

To avoid this scenario, an 8f system can be used. FIG. 4B shows a paraxial transmissive imaging design and illustrates how the beam steering element angle is magnified. For example, in FIG. 4B, the steered beam has twice a steering contribution. In example 450, $y_0=0$ and $\theta_0=0$ for clarity.

After the 8f system:

$$M_{2f}M_{2f}M_{2f}M_{2f}\begin{bmatrix} y_0 \\ \theta_0 + \phi_0 \end{bmatrix} = \begin{bmatrix} y_0 \\ \theta_0 + \phi_0 \end{bmatrix} \quad \text{Equation 16}$$

and when adding the beam steering element again:

$$\theta_f = \theta_0 + \phi_0 + \phi_0 = \theta_0 2\phi_0 \quad \text{Equation 17}$$

where the output angle achieves twice the steering from the beam steering element. In an 8Nf system where an 8f imaging is performed N times:

$$\theta_f = \theta_0 + N\phi_0 \quad \text{Equation 18}$$

This shows the multi-bounce nature of the angular magnification.

Accordingly, with reference to FIGS. 1 and 2, a single lens can be used to perform 8f self imaging of the beam steering element 104 to achieve a doubling of the beam steering angle range. For example, the first mirror 108 sits at the 2f and 6f points of the imaging system. The 4f image forms at the second mirror 110 that is below the beam steering element 104. The 8f plane is back on the beam steering element 104, where the beam is incident in the proper orientation and direction to magnify the effect of the beam steering element 104. In the example of FIGS. 1 and 2, a double bounce is shown. By adjusting an input angle, an initial angle of the beam steering element 104, and/or a lens aperture, greater beam magnification (e.g., more than two bounces) can be achieved.

As indicated above, FIGS. 4A-4B are provided as examples. Other examples may differ from what is described with regard to FIGS. 4A-4B.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When a component or one or more components (e.g., a mirror or one or more mirrors) is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "back," "front," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A beam steering system, comprising:
- a beam steering element configured to steer an optical beam having a beam waist,
  - wherein the beam steering element is oriented at a tilt angle relative to the optical beam; and
- an optical system, comprising:
  - a first mirror that faces the beam steering element;
  - a second mirror that faces the first mirror,
    - wherein the optical system is configured to return the optical beam to the beam steering element to provide multiple bounces of the optical beam on the beam steering element, and
    - wherein the beam waist of the optical beam is to be maintained from inputting the optical beam to the beam steering element to outputting the optical beam from the beam steering element; and
  - a lens between the first mirror, and the beam steering element and the second mirror.

2. The beam steering system of claim 1, wherein a first distance between the lens and the first mirror is approximately equal to a second distance between the lens and the second mirror.

3. The beam steering system of claim 1, wherein the beam steering element and the second mirror are a same distance from the first mirror.

4. The beam steering system of claim 1, wherein the optical system further comprises a third mirror that faces the first mirror.

5. The beam steering system of claim 1, further comprising a beam steering element array that comprises the beam steering element.

6. The beam steering system of claim 1, further comprising:
- an optical source configured to output the optical beam.

7. The beam steering system of claim 1, wherein the beam steering element is a micro-electromechanical systems (MEMS) mirror, a liquid crystal on silicon (LCoS) device, an optical phased array, or a metamaterial structure.

8. The beam steering system of claim 1, wherein an output angle of the optical beam from the beam steering element, resulting from the multiple bounces of the optical beam on the beam steering element, is approximately an integer multiple of the tilt angle.

9. An optical system, comprising:
- a first mirror configured to face a beam steering element that is to steer an optical beam having a beam waist; and
- a second mirror that faces the first mirror,
  - wherein the optical system is configured to return the optical beam to the beam steering element to provide multiple bounces of the optical beam on the beam steering element, and
  - wherein the optical system is configured to image the beam waist of the optical beam on the beam steering element; and
- a lens between the first mirror and the second mirror.

10. The optical system of claim 9, wherein the optical system is configured to return the optical beam to the beam steering element such that the beam waist of the optical beam is on the beam steering element.

11. The optical system of claim 9, wherein the beam steering element and the second mirror are a same distance from the first mirror.

12. The optical system of claim 9, wherein a first distance between the lens and the first mirror is approximately equal to a second distance between the lens and the second mirror.

13. The optical system of claim 12, wherein a focal length of the lens is approximately equal to the first distance and the second distance.

14. The optical system of claim 9, wherein the optical system further comprises a third mirror that faces the first mirror.

15. A beam steering system, comprising:
- a beam steering element configured to steer an optical beam having a beam waist; and
- an optical system configured to return the optical beam to the beam steering element to provide multiple bounces of the optical beam on the beam steering element,
  - wherein the beam waist of the optical beam is to be maintained from inputting the optical beam to the beam steering element to outputting the optical beam from the beam steering element, and
  - wherein the optical system comprises:
    - a first mirror that faces the beam steering element;
    - a second mirror that faces the first mirror; and
    - a lens between the first mirror, and the beam steering element and the second mirror.

16. The beam steering system of claim 15, wherein the beam steering element is part of a beam steering element array.

17. The beam steering system of claim 15, wherein the first mirror faces the beam steering element,
- wherein the second mirror faces the first mirror, and
- wherein the optical system comprises a third mirror that faces the first mirror.

18. The beam steering system of claim 15, wherein the beam steering element is a micro-electromechanical systems (MEMS) mirror, a liquid crystal on silicon (LCoS) device, an optical phased array, or a metamaterial structure.

19. The beam steering system of claim 15, wherein the optical system is configured to return the optical beam to the beam steering element such that the beam waist of the optical beam is on the beam steering element.

20. The beam steering system of claim 15, wherein an output angle of the optical beam from the beam steering element, resulting from the multiple bounces of the optical beam on the beam steering element, is at least approximately twice a steering angle of the optical beam from the beam steering element resulting from a single bounce of the optical beam on the beam steering element.

* * * * *